(12) United States Patent
Tada et al.

(10) Patent No.: US 6,295,062 B1
(45) Date of Patent: Sep. 25, 2001

(54) ICON DISPLAY APPARATUS AND METHOD USED THEREIN

(75) Inventors: Chikako Tada, Moriguchi; Masaru Tochishita, Osaka; Kunio Yamada, Kobe; Tetsuji Abe, Neyagawa, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/190,281

(22) Filed: Nov. 13, 1998

(30) Foreign Application Priority Data

Nov. 14, 1997 (JP) ................................................ 9-313001

(51) Int. Cl.$^7$ .................................................... G09G 5/00
(52) U.S. Cl. ........................................... 345/348; 345/765
(58) Field of Search .................................. 345/348, 349, 345/418, 335, 333, 334

(56) References Cited

U.S. PATENT DOCUMENTS 5,021,976 * 6/1991 Wexelblat et al. .................... 345/356
5,794,178 * 8/1998 Caid et al. ................................ 704/9
5,838,317 * 11/1998 Bolnick et al. ....................... 345/339
5,977,974 * 11/1999 Hatori et al. .......................... 345/349
6,097,393 * 8/2000 Prouty, IV et al. ................... 345/419

FOREIGN PATENT DOCUMENTS 8-63324    3/1996 (JP) ................................... G06F/3/14

* cited by examiner

Primary Examiner—Raymond J. Bayerl
Assistant Examiner—Tadesse Hailu
(74) Attorney, Agent, or Firm—Wenderoth, Lind & Ponack, L.L.P.

(57) ABSTRACT

An icon display apparatus reduces data to icons and displays those icons. The data corresponds to items classified into a plurality of groups and to apparatus for processing the data. A storage stores the data; a graphic generator produces a graphic data for visualizing those data as icons each representing an object in a multi-dimensional space; and a display displays those icons arranged in respective groups corresponding to attributes of data in the multi-dimensional space.

9 Claims, 15 Drawing Sheets

Fig. 9

GIAD

| GN | CFN | FFN | AFN | SFN | RA | DP | DC(x,y,z) | SG1 | SG2 | ... |
|---|---|---|---|---|---|---|---|---|---|---|
| Transmitting Group | ... | ... | ... | ... | ... | ... | ... | DVDD | NWA | ... |
| Receiving Group | ... | ... | ... | ... | ... | ... | ... | FDD | PDD | ... |
| ... | ... | ... | ... | ... | ... | ... | ... | ... | ... | ... |

Fig. 10

| GN | CFN | FFN | AFN | SFN | RA | DP | DC(x,y,z) | SG1 | SG2 | ⋯ |
|---|---|---|---|---|---|---|---|---|---|---|
| FDD | ⋮ | ⋮ | ⋮ | ⋮ | ⋮ | ⋮ | ⋮ | ⋮ | ⋮ | ⋮ |
| PDD | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ |

AIAD

Fig. 11

| GN | HL | DC(x,y,z) | SZ | SG1 | SG2 | SG3 | ... | SGN |
|---|---|---|---|---|---|---|---|---|
| Transmitting Group | 1 | 10,20,30 | 10 | CDD | TV | NULL | | |
| Receiving Group | 1 | 10,20,30 | 5 | FDD | VTR(VCR) | PDD | NULL | |
| CDD | 2 | 11,15,30 | 2 | NULL | | | | |
| TV | 2 | 12,27,35 | 2 | NULL | | | | |
| FDD | 2 | 14,15,30 | 2 | NULL | | | | |
| VTR(VCR) | 2 | 18,27,35 | 2 | NULL | | | | |
| PDD | 2 | 22,15,40 | 2 | NULL | | | | |
| NULL | | | | NULL | | | | |

Fig. 12

| GN | HL | DC(x,y,z) | SZ | SG1 | SG2 | SG3 | ... | SGN |
|---|---|---|---|---|---|---|---|---|
| Transmitting Group | 1 | 10,20,30 | 10 | CDD | TV | NWA | NULL | |
| Receiving Group | 1 | 10,20,30 | 5 | FDD | VTR(VCR) | PDD | NULL | |
| CDD | 2 | 11,15,30 | 2 | NULL | | | | |
| TV | 2 | 12,27,35 | 2 | NULL | | | | |
| FDD | 2 | 14,15,30 | 2 | NULL | | | | |
| VTR(VCR) | 2 | 18,27,35 | 2 | NULL | | | | |
| PDD | 2 | 22,15,40 | 2 | NULL | | | | |
| NWA | 2 | 12,30,40 | 2 | NULL | | | | |
| NULL | | | | NULL | | | | |

ICON DISPLAY APPARATUS AND METHOD USED THEREIN

BACKGROUND OF THE INVENTION

1. Field of the Invention

The present invention relates to an icon display apparatus and a method used therein that reduce data corresponding to items classified into a plurality of groups to icons and display the same, or reduce processing means for referring, copying, transferring or retrieving data to icons and display the same. And more specifically, it relates to an icon display apparatus providing a graphical user interface in which icons representing data and processing means are laid out and displayed in a correlated manner, and each icon is selected therefrom to enable desired processing.

2. Description of the Background Art

In apparatus such as a personal computer, various kinds of graphical user interface (GUI) have been conventionally provided. The graphical user interface enables a user by selecting a command to start a program, view a list of files, copy a file among apparatus and the like, by the user's operation of designating an icon or a menu item which is an image representation on a screen. Designation of an icon and a menu item is made by manipulating a pointing device, typified by a keyboard and a mouse. The Window's series marketed by Microsoft Corporation are representative examples of the graphical user interface.

In the graphical user interface, areas containing particular data and program, which are called windows, are displayed on a screen of an image display. In each window, a plurality of sub-windows are displayed. Moreover, in each sub-window or window, displayed are grouped icons representing a plurality of data, files or holders. These icons and sub-windows are two-dimensionally displayed and each icon and sub-window laid out independently of the attribute and function of an entity represented thereby.

Another graphical user interface that displays icons grouped according to data attributes includes "Data Managing Scheme and Icon Display Apparatus" disclosed in Japanese Patent Laying-Open No. 8-63324. In the gazette, disclosed is an example of using a stereoscopic image in three-dimensions as an icon. In the graphical user interface represented with the stereoscopic three-dimensional image, however, it is difficult for a user to control and select icons while viewing all icons at one time. That is to say, all apparatus available by the user are not displayed together on one screen, but divided to be displayed on several screens. Therefore, the user is required to look around on all screens for selecting an apparatus. Consequently, the graphical user interface fails to provide the user with a sense of realism, that is, the user can not grasp all available apparatus at a glance to make an arbitrary selection therefrom.

The present invention aims to solve the above-described problem. An object of the present invention is to provide a more user-friendly graphical user interface, that is, a graphical user interface with more realistic and friendly display images and selecting functions capable of reference, copy, transfer, deletion and retrieve of data such as selection of apparatus.

SUMMARY OF THE INVENTION

According to a first aspect of the present invention, an icon display apparatus for reducing data corresponding to items classified into a plurality of groups and a unit for processing thereof to icons and displaying the icons, comprises:

a visualizing unit for visualizing the data as icons each representing an object in a multi-dimensional space; and a display unit for displaying the icons arranged in respective groups corresponding to attributes of the data in the multi-dimensional space.

As apparent from the above, according to the first aspect of the present invention, displaying icons to which the data are reduced corresponding to attributes thereof in a multi-dimensional space enables a graphical user interface to be easily known by intuition. icon display apparatus of the first aspect, the display unit displays icons belonging to the same group in either of a circular form whereat the icons are connected to each other and a spherical form of a predetermined radius wherein the icons are arranged.

As apparent from the above, in the second aspect of the present invention, arranging icons in a circle or within a sphere can provide a graphical user interface where relationships between icons can be recognized at a glance.

According to a third aspect of the present invention, in the icon display apparatus of the first aspect, the groups include a group having an attribute representing a transmission, and a group having an attribute representing a receiving. According to a fourth aspect, in the first aspect, an icon display apparatus, further comprises a selection unit for selecting at least one icon out of the displayed icons; and a data process unit for performing a data processing based on the selected icon.

According to a fifth aspect, in the icon display apparatus of the second aspect, the selection unit rotates the icons arranged in either of the circular and spherical forms so that any one of the icons moves to a position suitable for selection.

As apparent from the above, in the fifth aspect of the present invention, rotating icons at a circle or within a sphere to a position suitable for the selection thereof can suppress the movement of pointing device. According to a sixth aspect of the present invention, in the icon display apparatus of the fourth aspect, the data process unit can perform at least one of data reference, data copy, data transfer, data deletion, and data retrieve.

According to a seventh aspect of the present invention, in the icon display apparatus of the first aspect, the display unit changes size of icon corresponding to a priority of data displayed thereby.

As apparent from the above, in the seventh aspect of the present invention, it is possible to instantaneously recognize a priority of data based on the size of icon therefor.

According to an eight aspect of the present invention, in the icon display apparatus of the seventh aspect, the priority is determined corresponding to the number of selection times of the icon.

According to a ninth aspect of the present invention, an icon displaying method for reducing data corresponding to items classified into a plurality of groups and a unit for processing thereof to icons and displaying the icons, the method comprises the steps of:

storing data;

visualizing the data as icons each representing an object in a multi-dimensional space; and displaying the icons arranged in respective groups corresponding to attribute of the data in the multi-dimensional space.

As apparent from the above, according to the ninth aspect of the present invention, displaying icons to which the data are reduced corresponding to attributes thereof in a multi-dimensional space enables a graphical user interface to be easily known by intuition.

According to a tenth aspect of the present invention, a storage medium contains thereon a computer program for controlling an icon display apparatus for reducing data corresponding to items classified into a plurality of groups and a unit for processing thereof to icons and displaying the icons, the computer program causing the computer to realize an operational environment comprising the steps of:

storing data;

visualizing the data as icons each representing an object in a multi-dimensional space; and displaying the icons arranged in respective groups corresponding to attributes of the data in the multi-dimensional space.

As apparent from the above, according to the tenth aspect of the present invention, it is easy to optimize the operation of the icon display apparatus only by exchanging a recording medium with another containing an improved program.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a diagram showing an example of group-icon management data contents according to the present invention;

FIG. 10 is a diagram showing an example of transmitting apparatus/receiving apparatus icon management data contents according to the present invention;

FIG. 11 is a graph showing the group icon management data before a change occurs in an apparatus connected to the icon display apparatus according to the present invention;

FIG. 12 is a graph showing the group icon management data after a change occurred in the apparatus connected to the icon display apparatus according to the present invention;

DESCRIPTION OF THE PREFERRED EMBODIMENTS

Embodiments of the present invention will be described in detail with reference to the drawings.

First Embodiment

Figure 1:
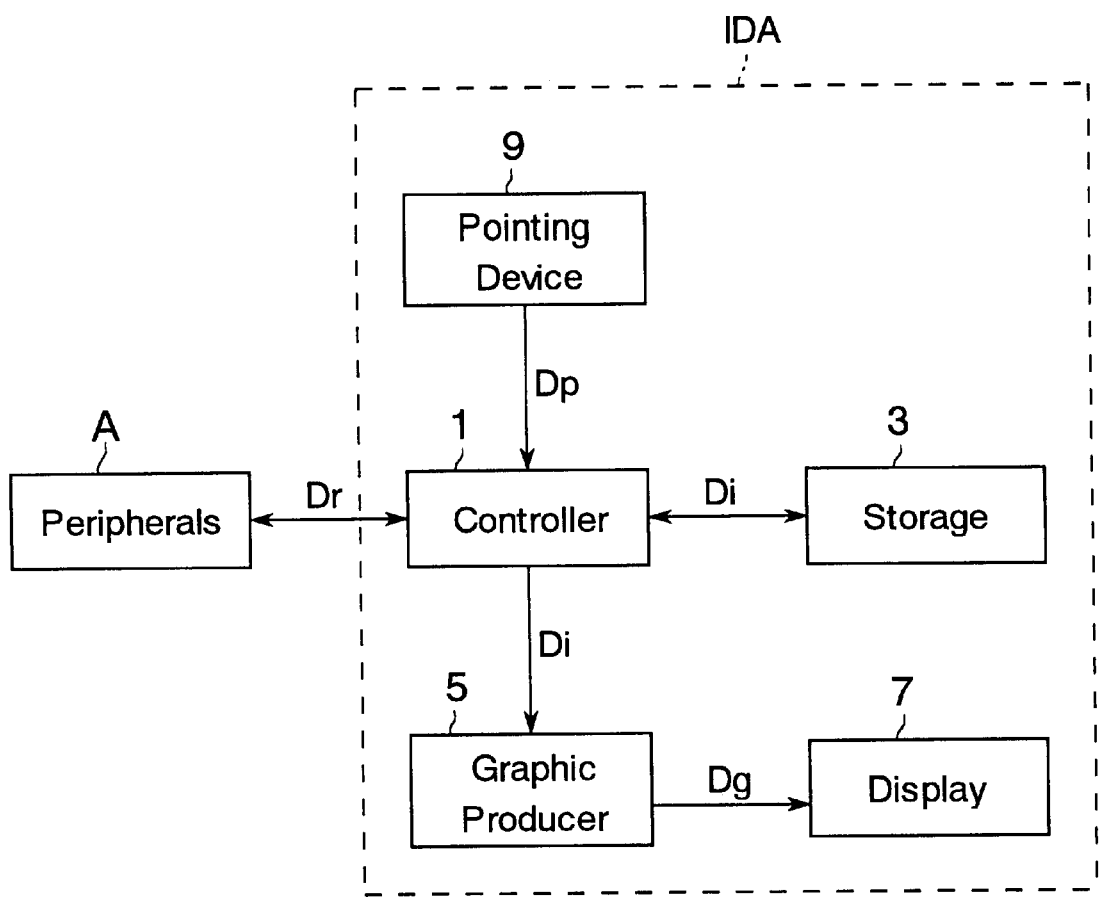
FIG. 1 is a block diagram showing a structure of an icon display apparatus according to a first embodiment of the present invention.

An icon display apparatus according to a first embodiment of the present invention is now described with referring to FIG. 1. An icon display apparatus IDA includes a controller 1, a storage 3, a graphic producer 5, a display 7, and a pointing device 9. The controller I recognizes peripherals A including various types of apparatus to which the icon display apparatus IDA is connected, and then produces icon data Di for defining an icon to be displayed. The storage 3 is connected to the controller 1, and stores the icon data Di. The graphic producer 5 is connected to the controller 1, and produces graphic data Dg for icon screen images displayed in the icon display apparatus IDA based on the icon data Di. The display 7 is connected to the graphic producer 5, and displays graphics Sm for a user interface containing icons based on the graphic data Dg. The peripherals A fall into two broad categories: a transmitting apparatus At as a data source, and a receiving apparatus Ar which receives and processes data sent from the transmitting apparatus At. Specific examples of the peripherals A are described below.

Figure 2:
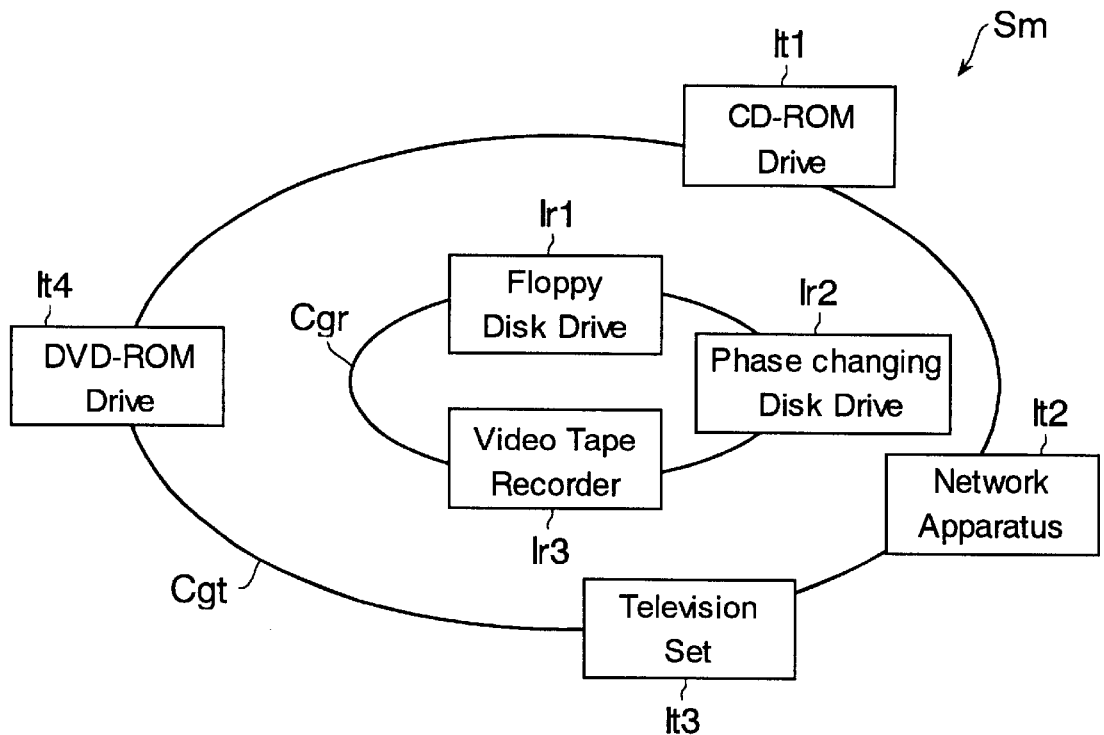
FIG. 2 is a diagram showing an example of basic screen images displayed in the icon display apparatus according to the first embodiment of the present invention.

In FIG. 2, an example of the basic screen images Sm displayed in the icon display apparatus IDA according to the first embodiment of the present invention is shown. In the basic screen images Sm, a plurality of icons It1 to Itn (n is an integer of not less than one) for respectively representing data transmitting apparatuses At1 to Atn, which are data sources, are laid out at predetermined intervals on a transmitting group circle Cgt. In the present embodiment, taken as an example of the data transmitting apparatuses At are a CD-ROM drive At1, a network apparatus At2, a television set At3, and a DVD-ROM drive At4. In this case, the icons It1 to It4 represent the CD-ROM drive At1, network apparatus At2, the television set At3, and the DVD-ROM drive At4, respectively.

In addition, on a receiving group circle Cgr, laid out at predetermined intervals are icons Ir1 to Irm (m is an integer of not less than one) for respectively representing data receiving apparatuses Ar1 to Arm which receive data sent from the transmitting apparatuses At1 to Atn and store them as required. In the present embodiment, taken as an example of the receiving apparatuses Ar are a floppy disk drive Ar1, a PD (Phase changing Disk) drive Ar2 and a video tape recorder Ar3. As in the case with the transmitting apparatuses At, the icons Ir1 to Ir3 represent the floppy disk drive Ar1, the PD drive Ar2, and the video tape recorder Ar3, respectively.

For brevity, the above-described icons are called the CD-ROM drive icon It1, the network apparatus icon It2, the television set icon It3, the DVD-ROM drive icon It4, the floppy disk drive icon Ir1, the PD drive icon Ir2, and the video tape recorder icon Ir3. Moreover, apparatus and icons newly described hereinafter will be referred in the same manner.

In the present invention, as stated above, it is possible to refer, copy, transfer, delete, and retrieve data with using groups of apparatus expressed as the icons which are displayed in the icon display apparatus IDA. Explained below is a method of operating the user interface when copying data from the transmitting apparatus At to the receiving apparatus Ar with using the icon display apparatus IDA according to the present embodiment, while describing the case of copying data from a DVD-ROM to a PD.

Selection of Transmitting Data

In order to select data to be copied, it is required at first to select an apparatus having the data among the transmitting apparatuses At. Specifically, on the basic screen images Sm shown in FIG. 2, the DVD-ROM drive icon It4 for representing the DVD-ROM drive At4 is selected on the transmitting group circle Cgt with utilizing the pointing device 9 like a mouse and so forth. The pointing device 9 is an input unit with which the user can select an arbitrary position in images including icons displayed in the icon display apparatus IDA. Generally known as the pointing device 9 are a mouse, a graphics tablet, a stylus, a light-pen, a joy stick, a puck, and a track ball but other units for selecting an arbitrary position on the screen may be also utilized as the pointing device 9.

Figure 3:
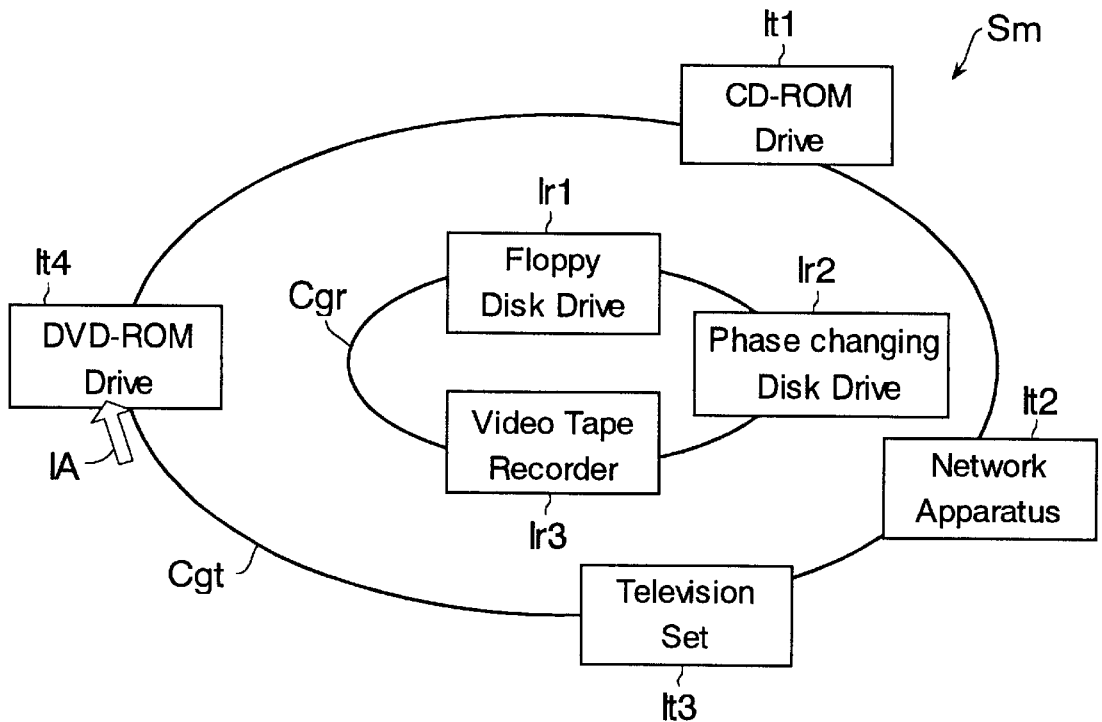
FIG. 3 is an illustration of a method of selecting one of transmitting apparatuses on a transmitting group circle Cgt displayed in the icon display apparatus shown in FIG. 2.

Referring to FIG. 3, procedure of selecting the DVD-ROM drive icon It4 is briefly described. In the drawing, an arrow IA is a cursor for representing movement of the pointing device 9, and is simply referred to as a cursor IA. In order to select the DVD-ROM drive icon It4, the cursor IA is moved on the basic screen images Sm until it is within the area of the DVD-ROM drive icon It4. Then, in the state that the cursor IA is overlaid on the DVD-ROM drive icon It4, a desired apparatus is set as a target to be selected. In the state where the desired apparatus is set as a selection target, an input is made so as to select the set apparatus as a selection target in accordance with an operating method previously determined for the pointing device 9. This series of operation is hereinafter referred to as a selection input.

Figure 4:
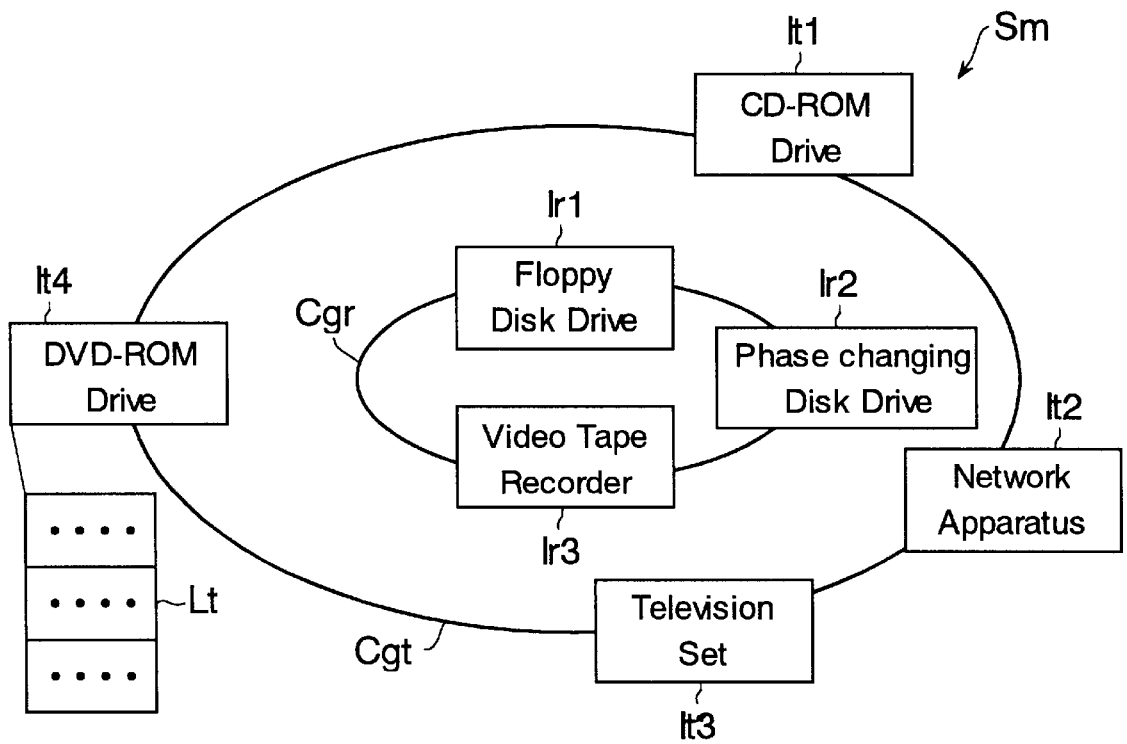
FIG. 4 is a diagram showing an example of displaying data contents included in a selected transmitting apparatus in the icon display apparatus shown in FIG. 3.

In response to the above-described selection input of the DVD-ROM drive icon It4, as shown in FIG. 4, an image Lt representing kinds of data recorded in the DVD-ROM drive At4 in a list form is displayed in connection with the DVD-ROM drive icon It4 on the basic screen images Sm.

Figure 5:
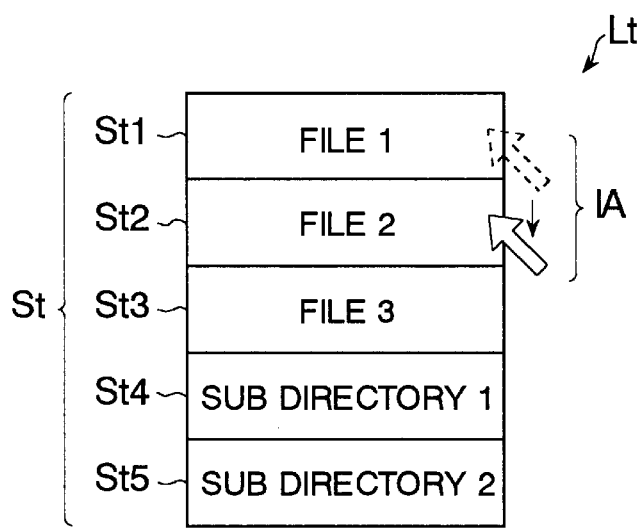
FIG. 5 is a diagram showing a detailed example of displaying the data contents included in the selected transmitting apparatus in the icon display apparatus shown in FIG. 4.

FIG. 5 shows the detailed data list expressed as the image Lt. In the image Lt, sub-images St1 to Sto (o is an integer of not less than one) which respectively correspond to the data recorded in a DVD-ROM contained in the selected DVD-ROM drive At4 are tiled and displayed. In the present example, the sub-images St1 to St5 respectively indicate that data files FILE1, FILE2, FILE3, a sub-directory 1, and a sub-directory 2 are recorded in the DVD-ROM contained in the DVD-ROM drive At4. The sub-images St may show the data contents with characters as in the present example, and also may show them with graphics or with combinations of both graphics and characters. The sub-images St corresponding to individual data are tiled and displayed in the above way, which results in displaying data in a list form. Instead of tiling the sub-images St, parts of the sub-images St may be overlaid on one another.

In the DVD-ROM contained in the DVD-ROM drive At4, data is recorded under a predetermined filing system. In the image Lt, displayed are files and directories recorded in the DVD-ROM in the DVD-ROM drive At4 according to the filing system. Specifically, the sub-images St1 to St5 respectively indicate that the data files FILE1, FILE2 and FILE3 and subdirectories 1 and 2 are recorded in the DVD-ROM in the DVD-ROM drive At4.

Assumed now is a case of selecting the data files FILE1 and FILE2 among the listed data. The user manipulates the above-described pointing device 9 to move the cursor IA in an area of the sub-image St1 representing the data file FILE1 on the display screen of the icon display apparatus IDA to select the data file FILE1. Then the user, while selecting the data file FILE1, moves the cursor IA in an area of the sub-image St2 representing the data file FILE2. Thus, the data files FILE1 and FILE2 which are recorded in the DVD-ROM contained in the DVD-ROM drive At4 are selected as files to be transmitted.

Selection of Receiving Apparatus

Described next is a method of copying the data files FILE1 and FILE2 selected in the above to a designated location in the data receiving apparatus Ar, that is, user-interface operation of selecting an apparatus in which the data is recorded among the data receiving apparatuses Ar1 to Aro and further selecting a location in the apparatus in which the data is recorded.

A selection input is made to an icon representing one of the receiving apparatuses Ar to which the selected data files FILE1 and FILE 2 are to be copied with using the pointing device 9, in the same manner with the operation of selecting transmission data explained with reference to FIGS. 3 to 5. Operation in a case of copying data to a PD in the PD drive Ar2 is described below as an example with reference to FIGS. 6 to 8.

Figure 6:
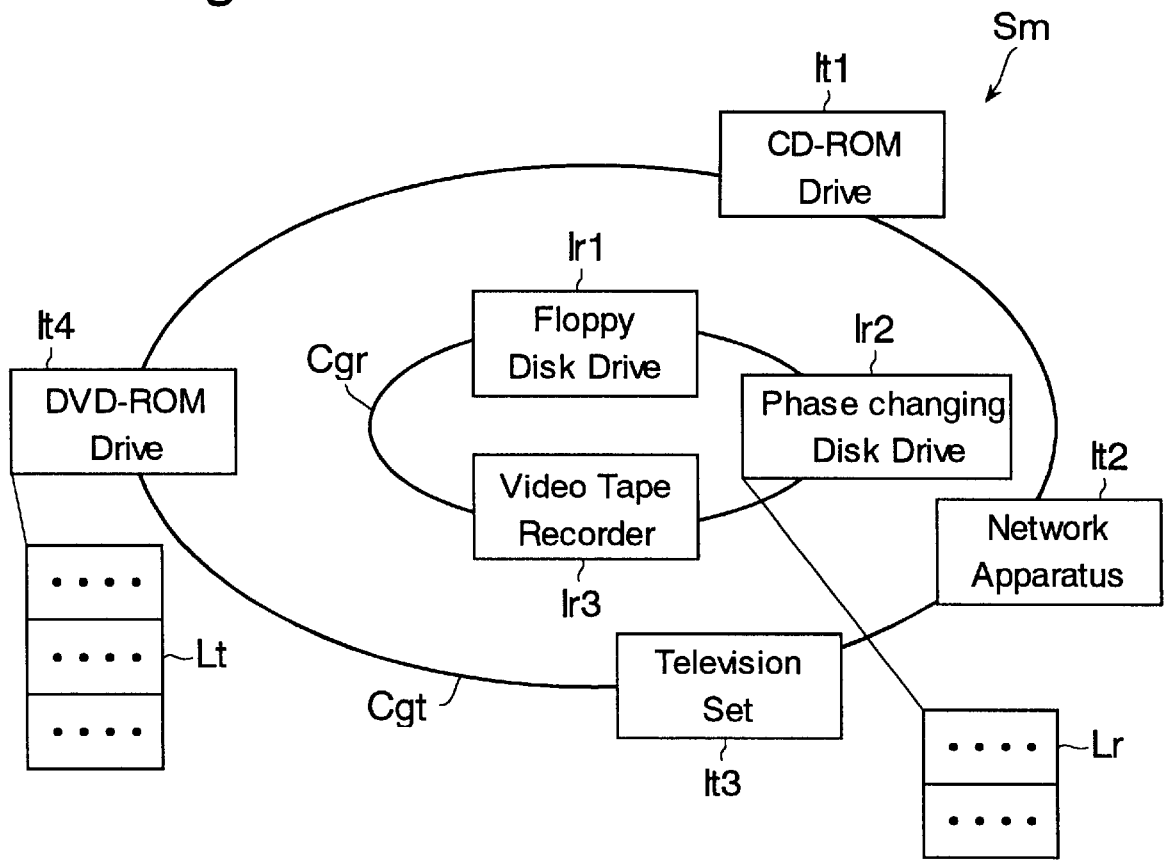
FIG. 6 is a diagram showing an example of displaying data contents recorded in a receiving apparatus selected from receiving apparatuses on a receiving group circle Cgr in the icon display apparatus shown in FIG. 4.

A selection input is made to the PD drive icon Ir2 with using the pointing device 9 as explained with reference to FIG. 2. In response to the selection input, as shown in FIG. 6, an image Lr for showing data currently recorded in the selected PD drive Ar2 in a list form is displayed in connection with the PD drive icon Ir2 on the basic screen images Sm in the icon display apparatus IDA.

Figure 7:
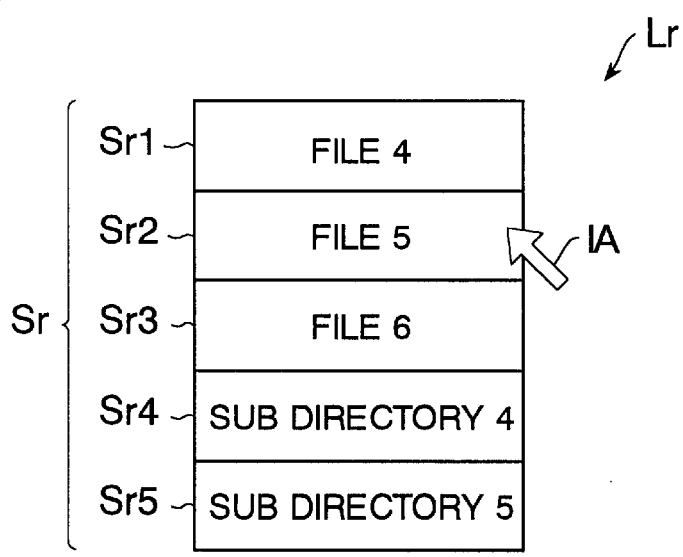
FIG. 7 is a diagram showing a detailed example of displaying the data contents included in the selected receiving apparatus in the icon display apparatus shown in FIG. 6.

In FIG. 7, shown is a detailed list of data expressed as the image Lr. The structure of the image Lr is substantially the same as that of the image Lt, hence the details thereof is omitted here. In the image Lr, as in the case with the image Lt, sub-images Sr1, Sr2, Sr3, Sr4 and Sr5 respectively indicate that data files FILE4, FILE5 and FILE6 and sub-directories 4 and 5 are recorded in accordance with a filing system of the PD drive Ar2.

Supposed here is a case of copying the data files FILE1 and FILE2 selected in the transmitting end between the data files FILE4 and FILE5 in the PD recording the above-mentioned data. First of all, with manipulating the pointing device 9, the user moves the cursor IA displayed on the basic screen images Sm of the icon display apparatus IDA in an area below the sub-image Sr1 for representing the data file FILE4 in the image Lr. Then the user manipulates the pointing device 9 in the state where the cursor IA stays in the area below the sub-image Sr1 to make a selection input to one of the sub-images Sr displayed under the cursor IA. In the example shown in FIG. 7, the user selects the sub-image Sr2 for representing the data file FILE5.

In response to the selection input in the area below the sub-image Sr1 for representing the data file FILE4, the icon display apparatus IDA further displays an image (not shown) to ask a query about whether the files are allowed to be copied or not on the basic screen images Sm. In the query image, provided is an interface in which the user makes a selection input with regard to GO and NO-GO about the copy. The user interface which prompts the user to make the selection input of GO or NO-GO preferably includes icons corresponding to both "GO" and "NO-GO".

Upon choosing "GO", i.e., "copy the file" on the query screen display, the selected data files FILE1 and FILE2 are actually copied from the DVD-ROM to a location between the data files FILE4 and FILE5 existing in a root directory in the PD.

Figure 8:
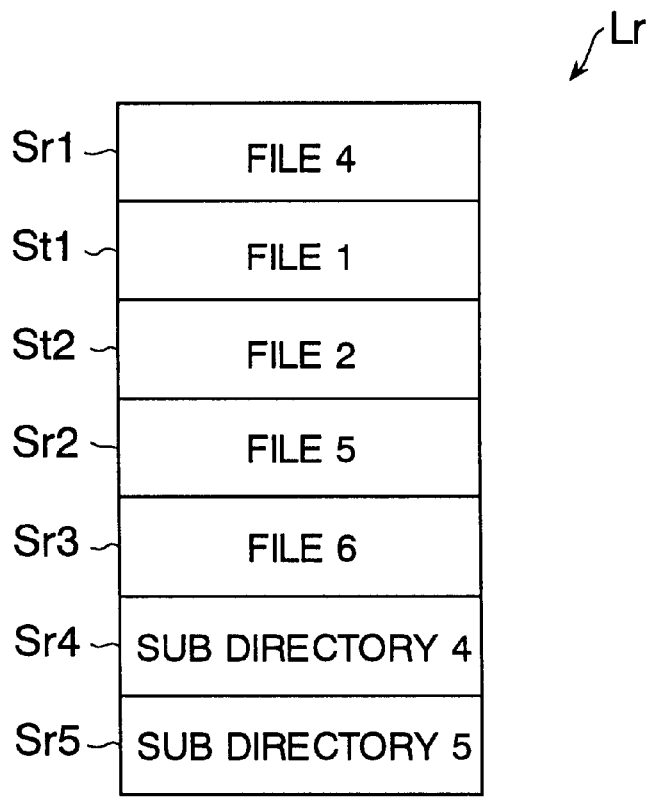
FIG. 8 is a diagram showing a state in which a file selected by a user from the data shown in FIG. 5 is copied to a location designated by the user in the data shown in FIG. 7, in the first embodiment of the present invention.

FIG. 8 shows the list display image Lr on the PD drive Ar2 side in the state after the data files FILE1 and FILE2 are copied. In consequence that the data files FILE1 and FILE2 are copied, the sub-images St1 and St2 for representing the copied data files FILE1 and FILE2 are inserted and displayed between the sub-images Sr1 and Sr2 in the image Lr.

In the present embodiment, when selecting a transmitting apparatus or receiving apparatus, the cursor IA for the pointing device 9 is moved to a corresponding icon on the basic screen images Sm of the icon display apparatus IDA. However, the icon may be moved without moving the cursor IA. An embodiment for such case will be described later with reference to FIG. 14.

Icon Data Management

Next, with reference to FIGS. 9 and 10, described below is an icon managing method for registering, deleting and modifying icon groups and transmitting apparatus/receiving apparatus icons displayed in the icon display apparatus IDA of the present invention.

In FIG. 9, the contents of group icon management data is shown. Group icon management data GIAD is composed of data belonging to the following items: a group name GN, a color file name CFN, a form file name FFN, an audio file name AFN, a substance file name SFN, a read/write attribute RA, display priority DP, display position coordinates DC, and a sub-group name SG. The user can alter data belonging to each item as required.

For example, the icons included in the transmitting group circle Cgt shown in FIG. 2 are registered in the group icon management data GIAD in the manner described later. Registered are a transmitting group TG as the group name GN, a CD-ROM drive CDD as a sub-group SG1, a network apparatus NWA as a sub-group SG2, a television set TV as a sub-group SG3, and a DVD-ROM drive DVDD as a sub-group SG4. Besides, as the other items, names of files having information for representing a window of the transmitting group TG, and read/write attributes and display priority of the files are registered.

Moreover, as for the icons included in the receiving group circle Cgr, as in the case with the icons included in the transmitting group circle Cgt, registered are a receiving group RG as the group name GN, a floppy disk drive FDD as the sub-group SG1, a PD drive PDD as the sub-group SG2, and a video tape recorder VTR (VCR) as the sub-group SG3. Besides, names of files having information for representing a window of the receiving group RG, and read/write attributes and display priority of the files are registered as the other items.

Registration and deletion of icons in/from the group icon management data GIAD are conducted in two ways described below.

In a first way, when an apparatus is newly connected to the icon display apparatus IDA, or when an apparatus already connected is disconnected from the icon display apparatus IDA, such change in connection situation is automatically perceived. Then an icon corresponding to the apparatus is added or deleted to/from the applicable group or circle for a group.

In a second way, when an apparatus is additionally connected to the icon display apparatus IDA, or when an apparatus already connected is disconnected from the icon display apparatus IDA, the user selects a group circle corresponding to the apparatus with manipulating the pointing device 9, thereby directly calls management data which manages the apparatus registered on the group circle, and alters the management data by himself/herself.

Figure 10:
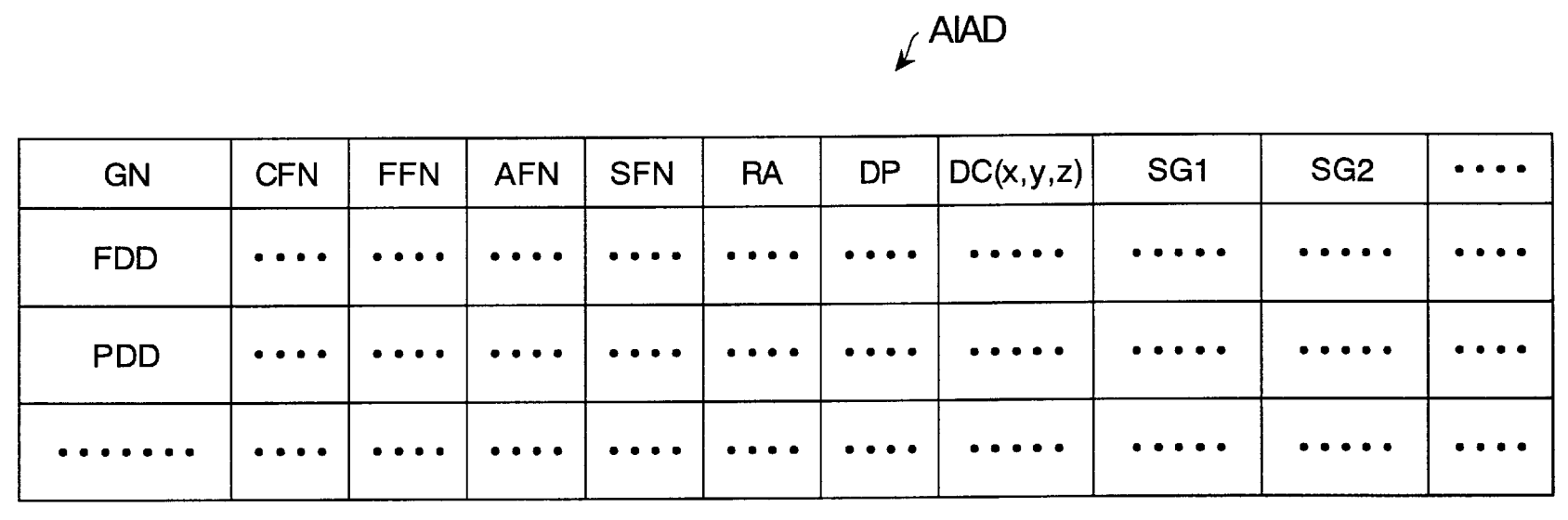

In FIG. 10, the contents of transmitting apparatus/receiving apparatus icon management data AIAD are shown. The transmitting apparatus/receiving apparatus icon management data AIAD, as in the case with the group icon management data GIAD shown in FIG. 9, is composed of data belonging to the following items: a group name GN, a color file name CFN, a form file name FFN, an audio file name AFN, a substance filename SFN, a read/write attribute RA, display priority DP, display position coordinates DC, and a sub-group name SG. The user can alter data belonging to each item as required. Data recorded in respective items are basically the same as those in the group icon management data GIAD, but are different from those in that a floppy disk drive, a PD drive and the like are recorded as the group name.

Figure 13:
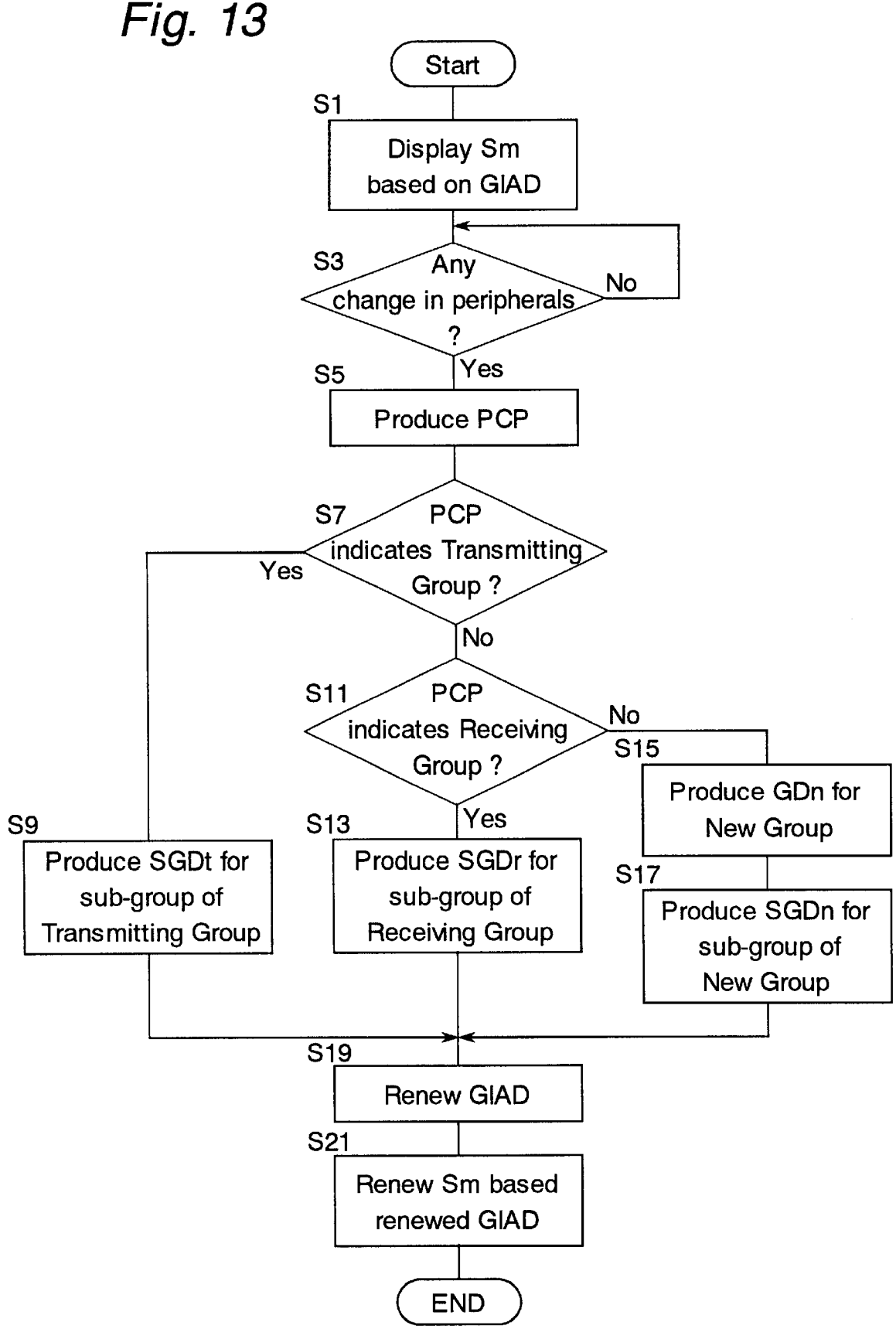
FIG. 13 is a flow chart delineating operation performed when a change occurred in the apparatus connected to the icon display apparatus according to the present invention.

Described in detail below with reference to FIGS. 11 to 13 is processing in the case where a change occurred in an apparatus connected to the icon display apparatus IDA in the present embodiment. The change includes the following situations: when an apparatus is newly connected to the icon display apparatus IDA, when a connected apparatus is disconnected, and when a state of a connected apparatus changes.

The group icon management data GIAD shown in FIG. 11, unlike the group icon management data GIAD shown in FIG. 9, is composed of data belonging to the following items: a group name GN, a hierarchy level HL, display position coordinates DC, size SZ, sub-group names SG1 to SGN (N is an integer of not less than one). The hierarchy level HL shows levels in a hierarchy among the above-described icons, in which HL=1 is a top level. The display position coordinates DC and the size SZ show a center position and size of a group (GN), respectively. In the list, sub-groups SG which belong to the group (GN) can be registered up to N number at the maximum. In the next item to the last registered sub-group, a NULL sign is registered to judge the last of the sub-groups currently registered.

In the example shown in FIG. 11, the group icon management data GIAD is formed from two groups: the transmitting group TG and the receiving group RG. The transmitting group TG has two sub-groups SG1 and SG2 which represent the CD-ROM drive CDD and the Television set TV, respectively. The receiving group RG has three sub-groups SG1, SG2 and SG3 which represent the floppy disk drive FDD, the video tape recorder VTR (VCR) and the PD drive PDD.

In FIG. 12, shown is the group icon management data GIAD in the case where the network apparatus NWA is added to the transmitting group TG shown in FIG. 11. Other than the icon information, information required for using each peripheral, which is not specifically shown in FIGS. 11 and 12, may be recorded in the group icon management data GIAD.

With reference to a flow chart shown in FIG. 13, described is operation of the icon display apparatus IDA in the case where a change occurred in the peripherals A connected thereto as shown in FIGS. 11 and 12. After the icon display apparatus IDA starts operation, the following is performed therein:

At Step Si, the controller 1 drives the graphic producer 5 based on the group icon management data GIAD recorded in the storage 3, and makes it produce the graphic data Dg. The display 7 displays the basic screen images Sm based on the graphic data Dg. Then the procedure advances to next Step S3.

At step S3, the controller 1 checks whether there is a change or not in the peripherals A connected to the icon display apparatus IDA. When it detects that a change occurred in a connected peripheral A, the procedure advances to next Step S5.

At Step S5, the icon display apparatus IDA detects information PCP about the peripheral A in which the change occurred. The processing at Steps S1 and S3 are realized by using known techniques such as the so-called plug and play. When a new peripheral A is additionally connected to the icon display apparatus IDA, properties of the new peripheral A are added to the peripheral information PCP adds. When the peripheral A already connected is disconnected or when the properties thereof are changed, the information PCP for denoting the change is produced with compared with data of the peripheral A recorded in the group icon management data GIAD. After producing the peripheral information PCP, the procedure advances to next Step S7.

At Step S7, it is judged based on the peripheral information PCP whether the peripheral A in which the change occurred belongs to the transmitting group TG of the transmitting apparatus At or not. When the peripheral A is a data source like the transmitting apparatus At, the result of the judgement is YES. Then the procedure advances to Step S9.

At Step S9, based on the peripheral information PCP, produced are data SGDt which correspond to respective items forming the sub-groups in the group icon management data GIAD. Then the procedure advances to next Step S19.

On the other hand, when it is judged as No at Step S7, that is, when it is judged that the peripherals A where the change occurred is not the transmitting apparatus At, the procedure goes to Step S11.

At Step S11, it is further judged based on the peripheral information PCP whether the peripheral A in which the change occurs belongs to the receiving group RG ornot. When it is judged that the peripheral A is an apparatus which receives and processes data sent from the transmitting apparatus At, like the above-mentioned receiving apparatus Ar, the procedure advances to Step S13.

At Step S13, produced based on the peripheral information PCP are data SGDr which correspond to respective items forming the sub-groups of the receiving group RG in the group icon management data GIAD. Then the procedure advances to next Step S19.

In contrast, when it is judged as NO at Step S11, that is, when it is judged that the peripheral A where the change occurred is not the receiving apparatus Ar, the procedure goes to Step S15.

At Step S15, since it is judged at Steps S7 and S11 that the peripheral A where the change occurred does not belong to the transmitting group TG nor the receiving group RG, data GDn which correspond to an item forming a new group in the group icon management data GIAD is produced based on the peripheral information PCP. Then the procedure advances to next Step S17.

At Step S17, further produced based on the peripheral information PCP are data SGDn which correspond to respective items forming the sub-groups in the new group in the group icon management data GIAD. After that, the procedure goes to next Step S19.

At Step S19, the group icon management data GIAD is renewed based on the sub-group data SGDt produced at Step S9, the sub-group data SGDr produced at Step S13, or the group data GDn and the sub-group data SGDn produced at Steps S15 and S17, respectively. Then the procedure advances to next Step S21.

At Step S21, the graphic data Dg is reproduced based on the renewed group icon management data GIAD. Based on the reproduced graphic data Dg, the basic screen images Sm are renewed and displayed. In this way, the change in the peripherals A connected to the icon display apparatus IDA is checked. When any change is detected, icons of peripherals A which are readable as currently available from the detected change are shown on the basic screen images Sm.

In the meantime, in the above-described flow chart, described is the case where the information required to use each peripheral A is recorded in the group icon management data GIAD as well as the icon information. It may be of course possible that such information is recorded in data other than the group icon management data GIAD, and based on the recorded information, the peripheral information PCP for denoting the change in the existing peripherals A is produced.

Second Embodiment

Figure 14:
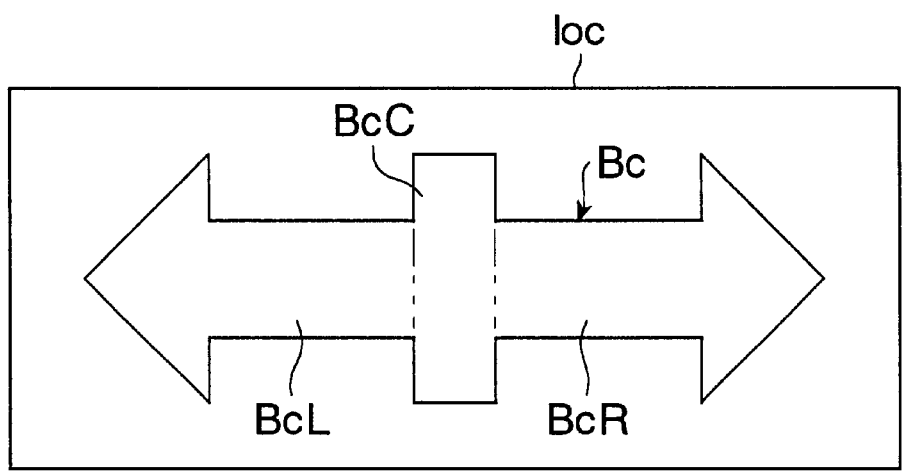
FIG. 14 is a diagram showing an object for controlling the circle in an icon display apparatus according to a second embodiment of the present invention.

Described below with reference to FIG. 14 is a graphical user interface provided by a display apparatus according to a second embodiment. In the present embodiment, a desired apparatus is selected, not by moving the cursor for the pointing device 9 as in the first embodiment, but by rotating the circles Cgt and Cgr representing the transmitting and receiving groups. The structure of basic screen images SmC in the present embodiment before a selection input is made is the same as that of the basic screen images Sm in the first embodiment described with reference to FIG. 2.

However, in the present embodiment, the pointing device 9 is manipulated in a predetermined manner in the state where the basic screen images SmC is displayed in the icon display apparatus IDA, thereby an image Ioc for an object Oc for controlling the circles is displayed at a predetermined position on the basic screen images SmC as shown in FIG. 14. In the circle control object Oc, a rotation bar Bc for rotating the circles is embedded.

When the circle control object Oc is displayed, the user manipulates the pointing device 9 on the basic screen images SmC, and thereby makes a choice between the transmitting group circle Cgt and the receiving group circle Cgr. Specifically, the user moves the cursor for the pointing device 9 within areas displaying the transmitting group circle Cgt and the receiving group circle Cgr, and then makes a selection input in the above-described manner to select a desired circle. After selecting the circle, the user further manipulates the pointing device 9 to move the cursor IA onto the rotation bar Bc, and then makes a selection input thereon. After that, the selected circle rotates clockwise or counter-clockwise depending on a portion in the rotation bar Bc in which the selection input is made to move one of the icons It or Ir placed on the circle.

More particularly, when the selection input is made in a right half BcR of the rotation bar Bc, the selected circle rotates clockwise with the icons. On the other hand, when the selection input is made in a left half BcL of the rotation bar Bc, the selected circle rotates counter-clockwise with the icons. The rotating speed can be controlled according to the selected position in the rotation bar Bc. For example, when the selection input is made in a portion closer to the right end in the right half BcR of the rotation bar Bc, the rotating speed in the clockwise direction increases. In contrast, when the selection input is made in a portion closer to the left end in the right half BcR of the rotation bar, the rotating speed in the clockwise direction decreases. That is to say, the rotation bar Bc is structured so that the selection input is made in a portion closer to a center portion BcC to decrease the rotating speed, and the selection input is made in a portion farther from the center portion BcC to increase the rotating speed. This is also applied to the left half BcL of the rotation bar Bc.

Next, when the icon corresponding to the desired apparatus is displayed in the closest front position of the user, the user stops the rotation by clicking the center portion BcC of the rotation bar Bc, and then makes a selection input to the icon in a predetermined manner, thereby the user can select the desired apparatus. Alternatively, an icon may be designated by a halt of rotation of the rotation bar Bc as one of possible manners of the selection input.

Furthermore, in the present embodiment, the circles are rotated like rings in the three dimensions. As the icon goes farther from the user, it is displayed in a smaller size, while as it comes closer to the user, it is displayed in a bigger size. This adds realism to display images, and increases user-friendliness so that the user can feel as if he/she were in the three dimensions. A method of representing whether the icon is close or far to/from the user includes not only the change in icon size, but also change in sound volume depending on the position of the icon, and addition of wind noise depending on the rotating speed of the circle. Thesemake the display images more realistic. It is needless to say that the processing to change the icon size and the sound volume depending on the position of the icon or the rotating speed of the circle can be performed based on the data included in respective items in the group icon management data GIAD and the transmitting apparatus/receiving apparatus icon management data AIAD described with reference to FIGS. 9 and 10. Furthermore, the color of the icon can be changed depending on the position of the icon.

In the present embodiment, a method of retrieving data with using the icon display apparatus IDA is the same as the method in the first embodiment with which data is copied by displaying the data list of the data storage and selecting the data therefrom.

Third Embodiment

With reference to FIGS. 15, 16, 17, 18 and 19, described is a graphical user interface provided by an icon display apparatus IDA according to a third embodiment of the present invention. In the present embodiment, unlike in the first and second embodiments, a plurality of apparatus of a same type are connected to the circle. Described below are methods for displaying and controlling data in the icon display apparatus IDA in the case where five CD-ROM drives Atl are connected to the transmitting group circle Cgt.

Figure 15:
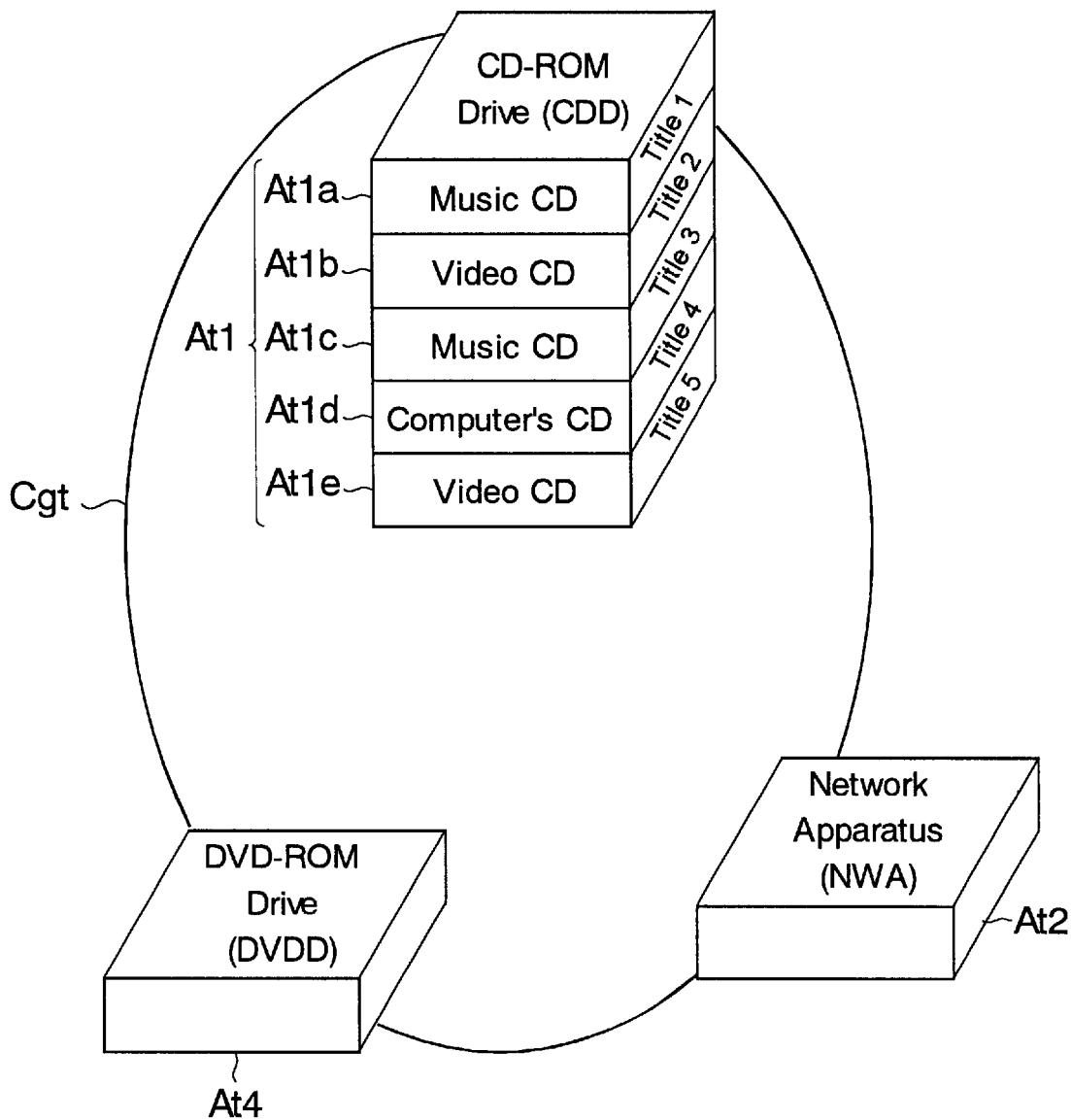
FIG. 15 is a diagram showing a state where a plurality of peripherals of a same type are connected to an icon display apparatus according to a third embodiment of the present invention.
Figure 16:
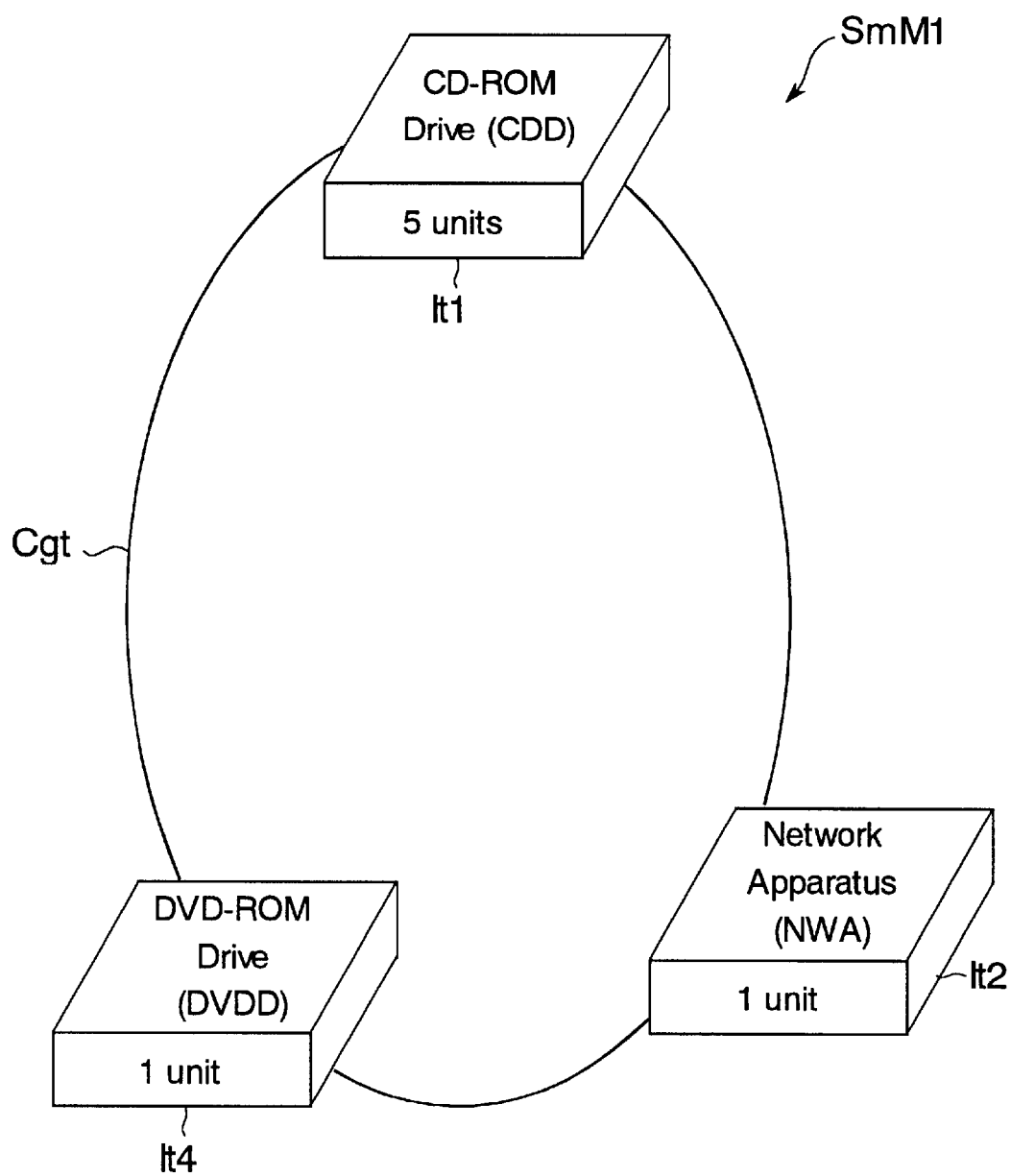
FIG. 16 is a diagram showing an example of screen images displayed in the icon display apparatus shown in FIG. 15.

It is assumed now that the five CD-ROM drives At1 are a first music CD-ROM drive At1a, a first video CD-ROM drive At1b, a second music CD-ROM drive At1c, a CD-ROM drive for computer At1d, and a second video CD-ROM drive At1e, respectively. As schematically shown in FIG. 15, the five CD-ROM drives At1, a network apparatus At2 and a DVD-ROM drive At4 are connected to the icon display apparatus IDA (circle Cgt) to form a transmitting group. There are following two methods for displaying icons on the transmitting group circle Cgt when the five CD-ROM drives At1 is connected:

A first displaying method is to display only one CD-ROM drive icon It1 on basic screen images SmMl of the icon display apparatus IDA as shown in FIG. 16. A second displaying method is to display the contents of the CD-ROM drives At1 specifically on basic screen images SmM2 of the icon display apparatus IDA as shown in FIG. 17.

Figure 17:
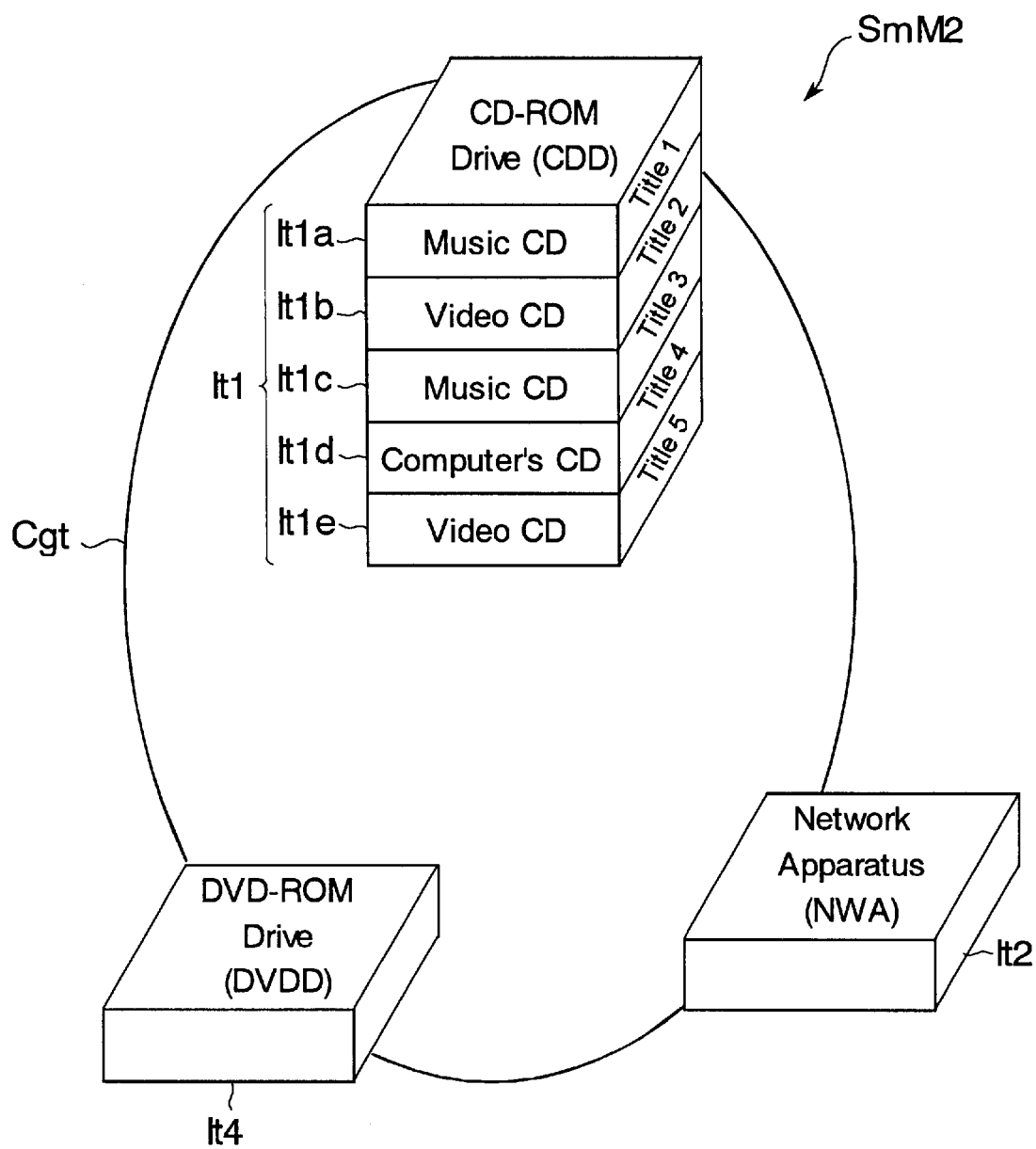
FIG. 17 is a diagram showing another example of screen images other than the example shown in FIG. 16 displayed in the icon display apparatus shown in FIG. 15.

In FIG. 17, only the transmitting group circles Cgt whereat network apparatus icon It2, the DVD-ROM drive icon It4, and CD-ROM drive icons It1a, It1b, It1c, It1d, and It1e representing 5 units of CD-ROM drives At1 are connected are shown for better visibility. However, the receiving group circles Cgr are naturally displayed in the basic screen image SmM2 of the icon display apparatus IDA as in the case with FIG. 2.

The two methods of displaying icons in the case that 5 units of CD-ROM drives At1 are connected to the icon display apparatus IDA are described in detail below.

In the first displaying method shown in FIG. 16, the number of CD-ROM drives is displayed in the CD-ROM drive icon It1 for indicating the operator that the one CD-ROM drive icon It1 represents a plurality of drives.

In the second displaying method shown in FIG. 17, the CD-ROM drive icon It1 is composed of five blocks of icons It1a to It1e which are expressed as stereoscopic three-dimensional images. The blocks represent the five CD-ROM drives At1 respectively. When a medium is inserted in the CD-ROM drive At1, the corresponding block displays therein a type of the medium on one surface thereof and a title of the medium on another surface thereof.

The user can make a choice between the first displaying method and the second displaying method. That is, the screen images can be alternately switched between the basic screen images SmMl and SmM2 by the user's manipulation of the pointing device 9 to make a selection input of the CD-ROM drive icon It1.

Figure 18:
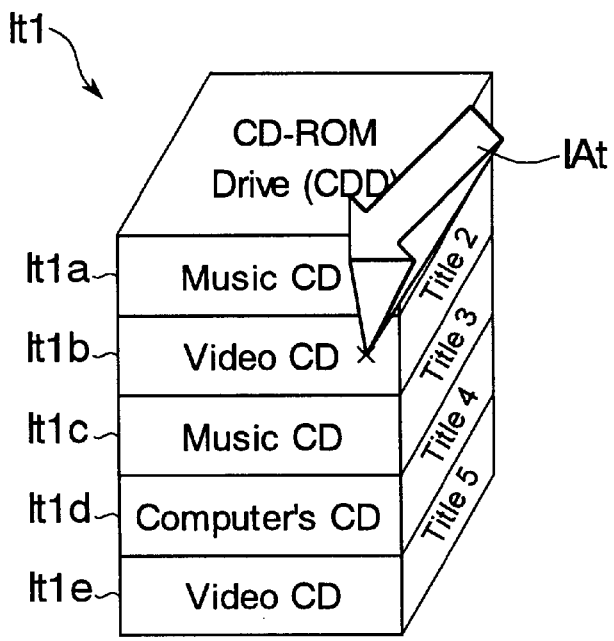
FIG. 18 is a diagram showing a method of selecting one of the plurality peripherals of the same type with a cursor in the screen images displayed in the icon display apparatus shown in FIG. 16.

Moreover, as shown in FIG. 18, in the second displaying method, the cursor IA for the pointing device 9 becomes a three-dimensional cursor IAt of a stereoscopic shape.

In order to select one of the plurality of CD-ROM drives At1a to AT1e with utilizing the cursor IAt, the pointing device 9 is manipulated to move the cursor IAt onto the CD-ROM drive icon It1. In this state, each tine the pointing device 9 is manipulated to make a selection input, the three-dimensional cursor IAt extends or contracts so as to sequentially designate each of the CD-ROM drive icons It1a to It1e corresponding to the CD-ROM drives At1a to At1e with the tip thereof.

For example, in FIG. 18, when the selection input is made with the pointing device 9 in the state where the tip of the cursor IAt designates the CD-ROM drive icon It1a, the tip of the cursor IAt extends so as to designate the CD-ROM drive icon It1b.

Then, when the pointing device 9 is manipulated to make a selection input again, the tip of the cursor IAt extends to designate the CD-ROM drive icon It1c.

After the above operation is repeated and the pointing device 9 is manipulated again for making a selection input in the state that the tip of the cursor IAt designates the last CD-ROM drive icon It1e, the tip of the cursor IAt returns to the first CD-ROM drive icon It1a so as to designate it.

Figure 19:
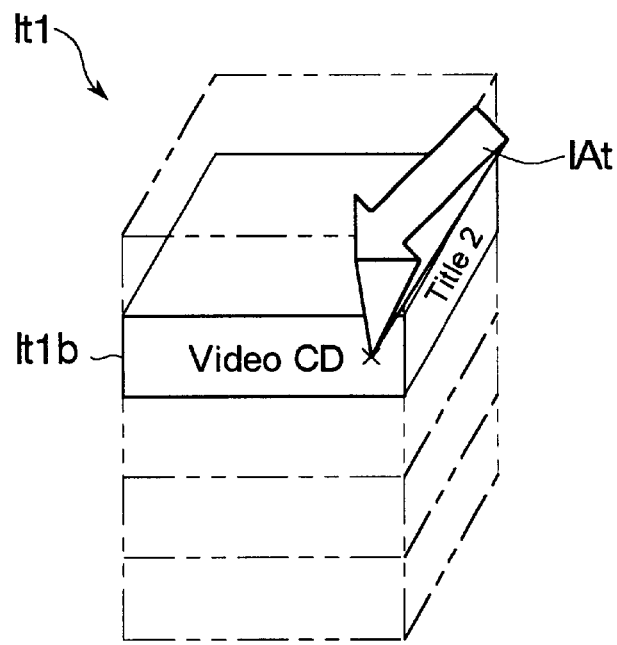
FIG. 19 is a diagram showing images displayed when one of the plurality of peripherals is selected with the cursor shown in FIG. 18.

By the above operation, the icons It1a to It1e representing five CD-ROM drive icons At1 respectively can be individually designated in serious order, enabling that arbitrary one of the plurality of CD-ROM drives At1a to At1e can be selected. In the state where the arbitrary CD-ROM drive is selected by individually designating an icon in the above way, the pointing device 9 is manipulated for a selection input in a predetermined manner, which is different from that individualy designating an icon, thereby, among the CD-ROM drive icons It1, only one of the CD-ROM drive icons It1 corresponding to the selected CD-ROM drive At1 is displayed with being emphasized as shown in FIG. 19. For example, in FIG. 19, when the pointing device 9 is manipulated to make a selection input in the predetermined manner in the state that the first video CD-ROM drive At1b is selected, only the CD-ROM drive icon It1b is displayed with being isolated in front. The operation thereafter is the same as the case when the CD-ROM drive At1 is only one.

The present embodiment can be applied not only to the case where the five CD-ROM drives At1 are connected to the transmitting group circle Cgt, but also to the case where five different types of CD-ROM are contained in one CD-ROM drive At1.

Fourth Embodiment

Figure 20:
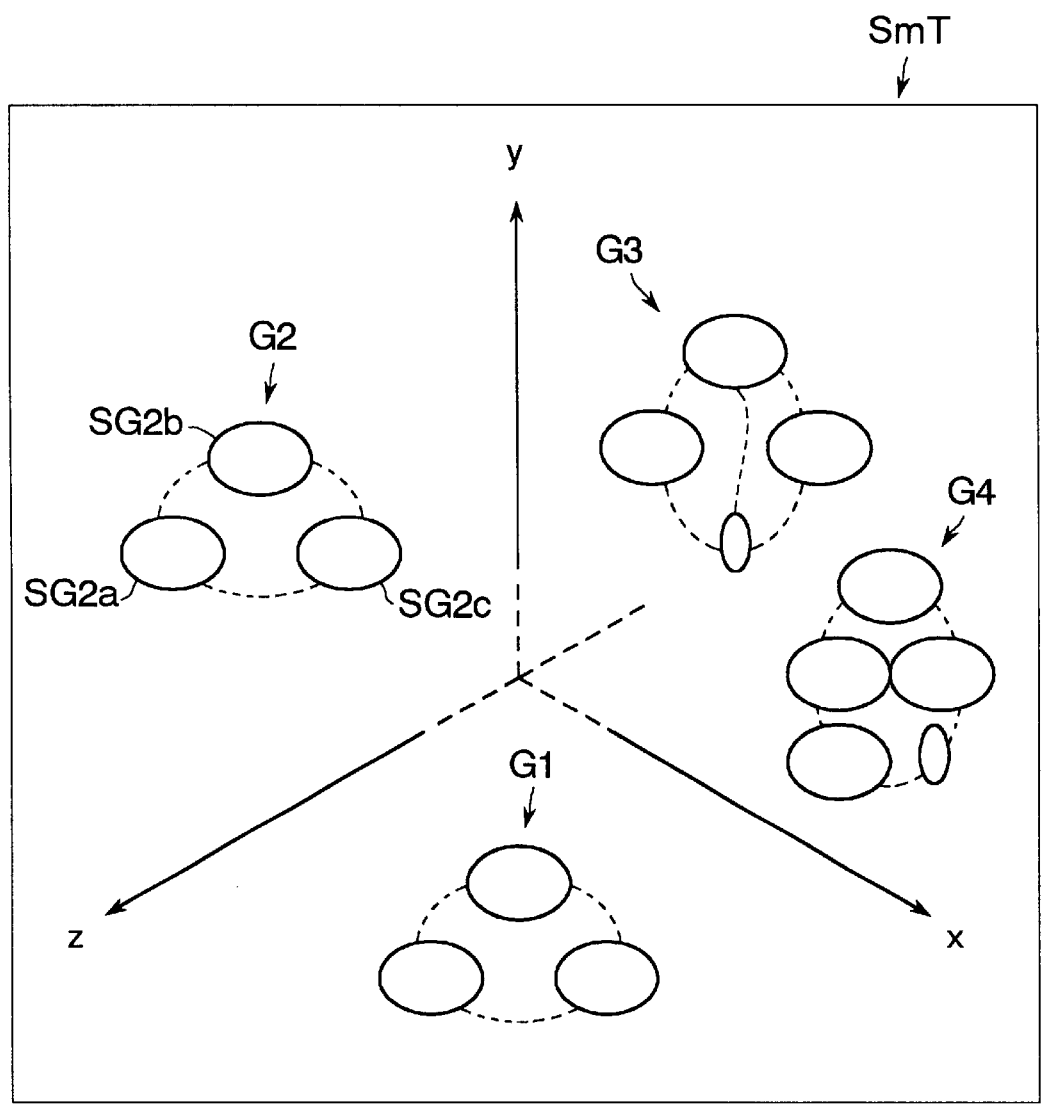
FIG. 20 is a diagram showing an example of screen images displayed in an icon display apparatus according to a fourth embodiment of the present invention.

With reference to FIG. 20, a graphical user interface provided by an icon display apparatus IDA according to a fourth embodiment of the present invention is described. In the present embodiment, in basic screen images SmT, objects including icons are expressed as three-dimensional globes. That is to say, a plurality of icons forming groups are laid out and displayed in globe forms each having a predetermined radius, thereby providing an easy-to-use user interface.

A first group G1, a second group G2, a third group G3 and a fourth group G4 are each displayed in a three-dimensional globe shape, which represent a personnel group, an engineering group, a sales group, and an accounting group, respectively.

Each group may include a plurality of sub-groups SG therein, which are expressed as smaller globes in the globe representing each group G.

For example, in the engineering group of the second group G2, there exist three sub-groups SG: liaison information SG2a, technical know-how information SG2b, and development project information SG2c.

Though not shown in FIG. 20, it is also possible that the liaison information SG2a which is a sub-group has a plurality of sub-groups including meeting minutes SG2a1, liaison of section SG2a2, topics of this week SG2a3.

In the present embodiment, respective information are hierarchically managed as described in the above. Besides, as shown in FIG. 20, the groups G expressed as globes are three-dimensionally displayed to vary in size according to the distance from the user. That is, the icons may be varied in size, specifically become larger to look near to the user or become smaller to look far from the user. In the present embodiment, the icon which is frequently designated is judged as an icon representing an important information group and expressed as a big globe so as to look near to the user. Similarly, the globe representing each sub-group SG is displayed to vary in size according to the distance.

In the present invention, the size of the icons are varied on the basis of the priority of each group or sub-group. Specifically, the priority of each group or sub-group is recorded in the display priority item DP in the group icon management data GIAD described with reference to FIG. 10, therefore the icon for a group or sub-group whose value in the display priority DP is high is displayed in a large size.

The display priority DP may be set by the user, or may be increased by one value each time the applicable group or sub-group is accessed.

In the case where the display priority DP is fixed by the user's setting, the priority is not changed according to the frequency of access to the applicable group or sub-group. However, the user can directly drag the globe surface of the group icon or the sub-group icon outward to display it in a large size, or drag it inward to display it in a small size.

Thus, the priority of each group and sub-group can be changed. In this case, the value of the display priority DP in the group icon management data GIAD is automatically varied according to the corresponding icon size. Described below is the operating procedure for accessing the data managed in a hierarchy of the above-described groups and sub-groups.

First, a group including data to be accessed is selected.

There are two ways for selecting the group: a way of manipulating the pointing device 9 to move the cursor IA in the same manner as in the first embodiment and directly designating a globe-shaped group icon, and a way of moving globes representing groups to select a globe in the closest front in the same manner as in the second embodiment.

In the former way, the cursor is moved to a globe representing the group including the data to be selected, and clicked thereon, thereby selecting the group. The user can quickly access the group since the globe representing the group is directly designated. However, when the groups increase in number and the globes displayed become smaller, it becomes difficult for the user to designate one of the globes.

In the latter way, for selecting the group including the data to be selected, the globe-shaped group icons are moved in three dimensional space virtually formed on the display screen, and then when the group icon to be selected comes in the closest front of the user, the user clicks the mouse to select the group. In this case, the operation is rather bothersome and redundant since the cursor is not directly moved to designate the group icon. On the other hand, there is a merit that when the number of the group icons become large, the user can rightly designate a desired icon. In addition, the moving speed of the group icons in three dimensions can be freely set with the rotation bar Bc described in the above. Adjustment of the moving speed makes it possible to shorten the time for selection, and ease operation of selection.

In the above way, the icon display apparatus IDA of the present invention can provide a more user-friendly graphical user interface with more realistic and friendly display images and selecting functions capable of reference, copy, transfer, deletion and retrieval of data.

Note that in the icon display apparatus IDA according to the present invention, the controller 3 is preferably a computer constructed by a CPU and necessary accessories. The controller 3 controls an operation of the icon display apparatus IDA based on a computer program. This computer program may be previously stored in the storage 3, and also may be readable from a recording medium in a suitable form (not shown in figures) into the storage 3.

While the invention has been described in detail, the foregoing description is in all aspects illustrative and not restrictive. It is understood that numerous other modifications and variations can be devised without departing from the scope of the invention.

What is claimed is:

1. An icon display apparatus for reducing data to icons and displaying the icons, wherein the data corresponds to items classified into a plurality of groups and to apparatus for processing the data, said icon display apparatus comprising:

storage means for storing the data;

visualization means for visualizing the data as icons each representing an object in a multi-dimensional space; and display means for displaying said icons arranged in respective groups corresponding to attributes of the data in said multi-dimensional space;

wherein said groups include a group having an attribute representing a transmission, and a group having an attribute representing a receiving.

2. An icon display apparatus as claimed in claim 1, wherein said display means displays icons belonging to the same group in either of a circular form whereat said icons are connected to each other and a spherical form of a predetermined radius wherein said icons are arranged.

3. An icon display apparatus as claimed in claim 1, further comprising:

selection means for selecting at least one icon out of said displayed icons; and data process means for performing a data processing based on said selected icon.

4. An icon display apparatus as claimed in claim 2, wherein said selection means rotates said icons arranged in either of said circular and spherical forms so that any one of said icons moves to a position suitable for selection.

5. An icon display apparatus as claimed in claim 3, wherein said data process means can perform at least one of data reference, data copy, data transfer, data deletion, and data retrieve.

6. An icon display apparatus as claimed in claim 1, wherein said display means changes size of icon corresponding to a priority of data displayed thereby.

7. An icon display apparatus as claimed in claim 6, wherein said priority is determined corresponding to the number of selection times of said icon.

8. An icon display method for reducing data to icons and displaying the icons, wherein the data corresponds to items classified into a plurality of groups and to apparatus for processing the data, said method comprising:

storing data;

visualizing the data as icons each representing an object in a multi-dimensional space; and displaying said icons arranged in respective groups corresponding to attributes of the data in said multi-dimensional space;

wherein said groups include a group having an attribute representing a transmission, and a group having an attribute representing a receiving.

9. A storage medium containing thereon a computer program for controlling an icon display apparatus (IDA) for reducing data to icons and displaying the icons, wherein the data corresponds to items classified into a plurality of groups and to apparatus for processing the data, said computer program being for use with a computer for causing the computer to realize an operational environment comprising:

storing data;

visualizing the data as icons each representing an object in a multi-dimensional space; and displaying said icons arranged in respective groups corresponding to attributes of the data in said multi-dimensional space;

wherein said groups include a group having an attribute representing a transmission, and a group having an attribute representing a receiving.

* * * * *